(12) United States Patent
Keenan

(10) Patent No.: US 11,408,774 B2
(45) Date of Patent: Aug. 9, 2022

(54) DEVICE FOR MEASURING THE TEMPERATURE OF A CONTAINER COMPRISING A FLUID

(71) Applicant: Paul Keenan, Woodlawn (CA)

(72) Inventor: Paul Keenan, Woodlawn (CA)

(73) Assignee: Canchill, Inc., Woodlawn (CA)

( * ) Notice: Subject to any disclaimer, the term of this patent is extended or adjusted under 35 U.S.C. 154(b) by 291 days.

(21) Appl. No.: 16/833,905

(22) Filed: Mar. 30, 2020

(65) Prior Publication Data

US 2020/0319035 A1    Oct. 8, 2020

(30) Foreign Application Priority Data

Apr. 3, 2019  (CA) ................................ CA 3038946

(51) Int. Cl.
| | |
|---|---|
| *G01K 1/14* | (2021.01) |
| *G01K 13/00* | (2021.01) |
| *G01K 1/024* | (2021.01) |
| *B65D 23/16* | (2006.01) |

(52) U.S. Cl.
CPC .............. *G01K 1/14* (2013.01); *B65D 23/16* (2013.01); *G01K 1/024* (2013.01); *G01K 13/00* (2013.01)

(58) Field of Classification Search
USPC ........................................ 374/208, 141, 163
See application file for complete search history.

(56) References Cited

U.S. PATENT DOCUMENTS

| | | |
|---|---|---|
| 3,864,976 A | 2/1975 | Parker |
| 4,538,926 A | 9/1985 | Chretien |
| 9,546,916 B1 * | 1/2017 | Crane .................... B65D 79/02 |

(Continued)

FOREIGN PATENT DOCUMENTS

| | | | | |
|---|---|---|---|---|
| DE | 29805200 U1 * | 5/1998 | ............. | G01K 1/143 |
| FR | 2833346 A1 * | 6/2003 | ............. | G01K 1/143 |

(Continued)

OTHER PUBLICATIONS

Kelvin Wireless Wine Thermometer, Model: Duo, Instruction Manual, Available at www.mykelvin.co.uk, Art Ref: 72002-7001-10, access date Nov. 1, 2019.

*Primary Examiner* — Mirellys Jagan
(74) *Attorney, Agent, or Firm* — Pauley Erickson & Swanson

(57) ABSTRACT

Disclosed is a sensing device for measuring the temperature of a container enclosing a fluid that is stationary or in motion, the sensing device comprising: a band for completely encircling and conforming to the outer surface of the container;

a thermally conductive material disposed on a housing portion that abuts the surface of the container on one side when the device is mounted on the container and on a second side abuts the temperature sensor;

a wireless communication means in communication with the sensor, wherein the wireless communication means transmits temperature data to a remote wireless device, thereby notifying a user when a temperature measurement falls above or below a target temperature or range thereof; and the band being made of elastomeric material so that when mounted on the container, or tightened therearound, the temperature sensor abuts snugly against the thermally conductive material.

10 Claims, 11 Drawing Sheets

(56) References Cited

U.S. PATENT DOCUMENTS

| | | | |
|---|---|---|---|
| 2002/0191673 A1* | 12/2002 | Lee | G01K 1/14 |
| | | | 374/208 |
| 2006/0026971 A1* | 2/2006 | Sharpe | G01K 13/00 |
| | | | 62/126 |
| 2006/0181410 A1 | 8/2006 | Staples | |
| 2007/0053407 A1 | 3/2007 | Kinsler | |
| 2012/0019398 A1 | 1/2012 | Vogt et al. | |
| 2014/0161151 A1* | 6/2014 | Proctor | G01K 13/02 |
| | | | 374/147 |
| 2016/0131533 A1 | 5/2016 | Parker et al. | |

FOREIGN PATENT DOCUMENTS

| | | | |
|---|---|---|---|
| GB | 2400660 | 7/2005 | |
| WO | WO-2016151434 A1 * | 9/2016 | G01K 1/143 |

\* cited by examiner

DEVICE FOR MEASURING THE TEMPERATURE OF A CONTAINER COMPRISING A FLUID

CROSS-REFERENCE TO RELATED APPLICATIONS

This application claims benefit of Canadian Application No. 3,038,946 filed Apr. 3, 2019, which is incorporated herein by reference in its entirety.

TECHNICAL FIELD

The present disclosure relates to an elastomeric device that measures the temperature of the contents of a container holding a fluid.

BACKGROUND

For many alcoholic beverages, such as wine or beer, the serving temperature of the product should fall within a pre-defined range for optimal taste. For example, the ideal serving temperature of white wine often ranges between 6-11 degrees Celsius for optimal flavor, while the temperature of red wine varies within a range of 10-18 degrees Celsius. The precise serving temperature within these ranges further varies with the kind of white or red wine being served. With respect to white wine, Pinot Gris, Riesling and Sauvignon Blanc should be served at around 7-10 degrees Celsius, while Chardonnay, Viognier and white Bordeaux should be served around 10-11 degrees Celsius. Achieving such precise target temperatures is problematic since the temperature of a refrigerator does not typically fall outside the narrow range of around 3-6 degrees Celsius. If red or white wine is chilled to the same temperature as the interior of the fridge, it may become too cool, which in turn negatively affects its flavour.

Analogous considerations apply when bottled or canned beer is placed in a freezer for quick chilling. Although beer connoisseurs might be less concerned about the contents of the bottle reaching a precise serving temperature, if the bottled or canned beer is placed in the freezer too long, the contents may freeze and expand, thereby shattering the bottle or can.

While it might be possible to predict the precise point in time when a beverage should be removed from a fridge or freezer for serving, this is difficult to estimate in practice as it may require some amount of trial and error. Periodically removing the cork of a wine bottle, inserting a thermometer into the neck of the bottle, followed by replacing the cork at intervals is also impractical. In the case of quick chilling of beer in a freezer compartment, the beer bottle or can may simply be forgotten about and this may result in shattering of the bottle or can as mentioned above. This problem may be exacerbated during the viewing of sports programs on television, or other forms of entertainment that often engage the full and devoted attention of the viewer (apart from the occasional advertisement break).

US 2016/01311533 discloses a bottle temperature reading device that employs a C-shaped clamp made of resilient material that partially fits around the circumference of a wine bottle. A temperature sensor embedded in the inner surface of the body of the clamp contacts the external surface of the bottle and measures its temperature at the contact point. When a target temperature is reached, a signal is transmitted to a wireless display device which indicates that the beverage is ready for serving. However, the C-shaped clamp design suffers from a number of design shortcomings. Because the clamp is not particularly malleable, the temperature of the area surrounding the sensor may be impacted by the ambient fridge temperature since the clamp may not conform precisely to the outer contours of the bottle, thereby leaving gaps between the inner surface of the clamp and the bottle surface. Temperature strips have been described for measuring the external temperature of a bottle.

U.S. Pat. No. 3,864,986 describes a laminated thermometer for determining the temperature of a fluid in a container. A thermometer strip 14 contains liquid crystal compositions that measure the temperature of the surface of a bottle. Digits formed on the strip indicate the temperature of the bottle as measured by the strip 14. U.S. Pat. No. 4,538,926 likewise describes a temperature sensing device composed of a short strip having adhesive thereon for securement to the side of a bottle. Liquid crystals also form a sensing element and a colour strip indicates the temperature of the bottle. However, such temperature strips may be prone to incorrect readings due to the ambient temperature.

GB2,400,660 describes a device that fits within, and measures the temperature of, a region within the concave base of a wine bottle. It is believed that temperature measurement within the space of the concave base would provide a more accurate reading than other regions of the bottle surface since the region is comparatively less exposed to ambient temperature conditions. The device has a spring with a temperature probe 3 positioned at its distal end and a bottle rests on top of the device so that the probe abuts the outside surface of the concave region. However, the device has a number of complex parts, which may potentially render it costly to manufacture.

Liquids within other containers besides those that hold beverages can benefit from accurate temperature measurements using a device that is simple to use. For example, a device that could measure the temperature of liquid in a pipe would be useful to notify a user before the pipe freezes. Medical liquids in vials or other containers could also benefit from such ease of temperature measurement.

Accordingly, there is a need in the art for a device that measures the temperature of the contents of a fluid within a container with relative accuracy for the purpose at hand and that is easy to use and/or manufacture.

SUMMARY

Disclosed herein in certain embodiments is a device that measures the temperature of the contents of a solid container enclosing a liquid, including a beverage, such as wine or beer, or other liquid, including other consumable and non-consumable liquids alike. In particular, the device measures the temperature of the exterior surface of the container, thereby providing a reading at least approximating the temperature of its liquid contents. The device comprises a band that fits around the outside circumference of the body of a container and comprises a portion that accommodates an electronic temperature sensor that measures the surface temperature of the container when the device is in use. In select embodiments, the device is advantageously sized to fit snugly around the circumference of any standard wine or beer container, including a bottle or can. For example, the elastomeric material may be constructed of plastic or silicone. In a further embodiment, the band is prepared from other materials, such as a fabric, including a material that is knit or woven. Closure means, such as Velcro™ or other fasteners, including snaps, can be used to secure and provide a snug fit around the contours of the surface of the container.

The device operates by measuring the surface temperature of the container enclosing the fluid therein. Thus, the surface of the container is used as an indicator of the temperature of the contents of the container.

According to one embodiment, there is provided a sensing device for measuring the external temperature of a container enclosing a fluid that is stationary or in motion, the sensing device comprising:
a band for completely encircling and conforming to the outer surface of the container a housing portion attached to or integral with the band that accommodates a temperature sensor for contact with and for measuring the temperature of the outer surface of the container;
a thermally conductive material disposed on the housing portion that abuts the surface of the container on one side when the device is mounted on the container and on a second side abuts the temperature sensor;
a wireless communication means in communication with the sensor, wherein the wireless communication means transmits temperature data to a remote wireless device, thereby notifying a user when a temperature measurement falls above or below a target temperature or range thereof; and
the band being made of elastomeric material so that when mounted on the container, or tightened therearound, the sensor abuts snugly against the thermally conductive material.

A further embodiment provides a sensing device for measuring the external temperature of a container enclosing a liquid, the sensing device comprising:
a band for encircling and conforming to the outer surface of the container;
a housing portion attached to or integral with the band that accommodates a temperature sensor for contact with and for measuring the temperature of the outer surface of the solid container, wherein the housing portion is made of an insulating material and is dimensioned to surround and shield the outer surface of the container in contact therewith from ambient temperature when the band is secured to the container; and
a wireless communication means in communication with the sensor, wherein the wireless communication means transmits temperature data to a remote wireless device, thereby notifying a user when a temperature measurement falls above or below a target temperature or range thereof as determined at a time point after a time delay to account for thermal conductivity of a material type of the container, wherein the band entirely encircles the circumference of the container when in use to thereby secure the housing portion in a snug fit to the container.

Different materials conduct heat to different degrees and thus the accuracy of the measurement by the device may depend on the thermal conductivity of the material from which the container is constructed. For example, metal conducts heat quite readily, and thus has high thermal conductivity, while plastic has a lower thermal conductivity. In order to factor this into the temperature determination, in one embodiment, the temperature read by the sensor, or recorded by the device, or by an associated wireless system, is delayed for a set period of time based on the kind of material being measured until an accurate reading can be made. For containers made of materials of high thermal conductivity, the temperature delay is less than for materials of low thermal conductivity.

In one embodiment, the device comprises an electronic sensor that detects the material type of the container. In an alternate embodiment, a user enters the material type into the device itself or via a computer-based application on an external device, such as a Smart phone. After the material type is detected or otherwise inputted into the system, the device can automatically delay a temperature reading until adequate time has elapsed for the container material to reach a temperature that corresponds to or approximates that of the liquid contents. In a further embodiment, the sensor is not prompted to take a reading until after the time delay. Alternatively, the sensor takes temperature readings before and after the time delay, but a temperature reading is not recorded until after the time delay.

The amount of time that elapses before a temperature reading is carried out, recorded or registered, can be predetermined by those of ordinary skill in the art based on the thermal conductivity of the material from which the container is made.

A further advantageous feature of a non-limiting embodiment of the disclosure is the provision of an insulating housing that shields the temperature sensor from the ambient temperature of a temperature-controlled environment, such as a fridge, freezer or other environment.

The housing region may protrude from the band of the device to provide a sufficient physical barrier around the sensor or other electronic components to shield the sensor from the external temperature. In one embodiment, the width of the housing is at least 2, 2.5, 3, 3.25, 3.5, 4.0, 4.5, 5.0, 5.5 or 6.0 times that of the band (at its smallest width) measured in a radial direction when mounted on the container to facilitate insulation. The shielding effect is provided by a snug fit of the band and insulating housing that is facilitated by the unique design of the housing region and materials used to provide the insulation function. The housing enclosure is most advantageously made of a material that has a thermal conductivity of less than 10, less than 9, less than 8, less than 7, less than 6, less than 5, less than 4, less than 3, less than 2 or less than 1. Depending on the size of the sensing device, the walls of the housing may have a thickness of greater than 1 mm, 2 mm, 3 mm, 4 mm, 5 mm, 6 mm, 7 mm, 8 mm, 9 mm or 1 cm. In a further embodiment, the insulating housing enclosure is made of the same material throughout, thereby ensuring ease of manufacture.

In a further or alternative embodiment, the band of the device is adapted to fit snugly around the entire circumference of the container. The band may also facilitate a snug fit of the internal surface of the housing region to the outer surface of the container, thereby enhancing the shielding effect of the housing region. In one embodiment, the provision of band arms that encircle the entire circumference of the container provides sufficient tension to secure the housing in a tight fit around the region of the housing that abuts the container. In one embodiment, the arms overlap at their distal ends and provide the necessary tension for a snug fit, although other securement means are encompassed by the disclosure herein.

In one embodiment, the device comprises a liquid crystalline display for displaying the temperature of the surface of a container after its placement in a temperature controlled environment and, in some embodiments, the temperature is displayed only when sufficient time has elapsed to make an accurate temperature reading. In another example, alternatively or in addition, the device comprises a means for wirelessly communicating temperature information to a wireless device, such as a Smart device. In one embodiment, the user of a wireless device, such as a Smart phone, can download an application that sends a text message to the user when the temperature of the surface of the container falls above or below a pre-set value selected by the user. In one embodiment, the container is a beer bottle or can and a notification is sent by a user's Smart phone, or other wireless device, to communicate that the external surface of the beer bottle or can has fallen below a predetermined temperature, such as a freezing temperature. As described herein, in yet further embodiments, the container is a pipe or a container that holds liquid medicine.

In some examples, the wireless communication means is a microcontroller or System on a Chip (SOC) for sending a signal representing a temperature reading, as read by the temperature sensor, to the remote wireless device. In one embodiment, the wireless communication means is a Bluetooth™ transceiver module.

Further provided is a computer implemented system for receiving wireless temperature data from the temperature sensing device any one of the foregoing aspects and embodiments, such system notifying a user when a temperature falls above or below a target temperature. In one embodiment, the system is an application that is downloadable on a wireless device. In another embodiment, the system, when downloaded on a phone and executed by a user, prompts the user to enter or select the type of material or the type of container that is being measured to account for thermal conductivity properties of the container.

Another embodiment is directed to a computer implemented system for receiving wireless temperature data from a temperature sensing device used to measure an external temperature of a container enclosing a liquid and comprising wireless communication means for communication of the temperature data with the computer implemented system, the system notifying a user by a text message on a wireless phone when a measured temperature received from the temperature sensing device falls above or below a target temperature. In one embodiment, the container is beer that is bottled or canned and a user is notified by the system after a period of time has elapsed, but before the beer freezes after its placement in a freezer.

DETAILED DESCRIPTION

Figure 1A:
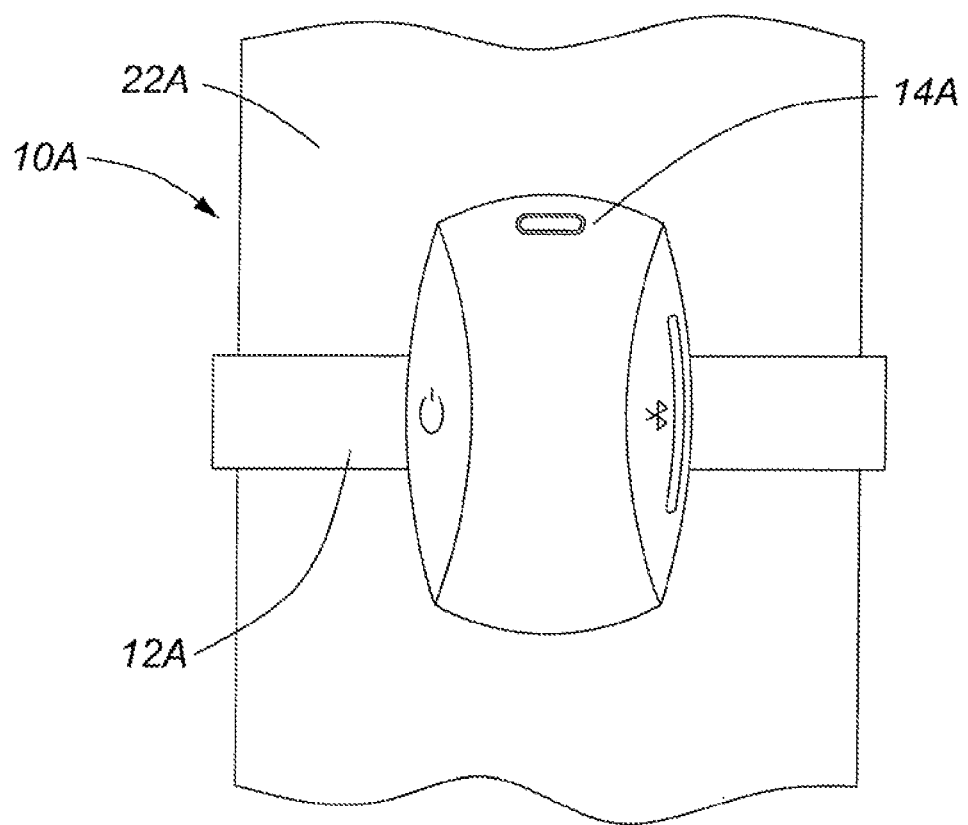
FIG. 1A is a top perspective view of a temperature reading device mounted on a container according to certain embodiments as described herein.
Figure 1B:
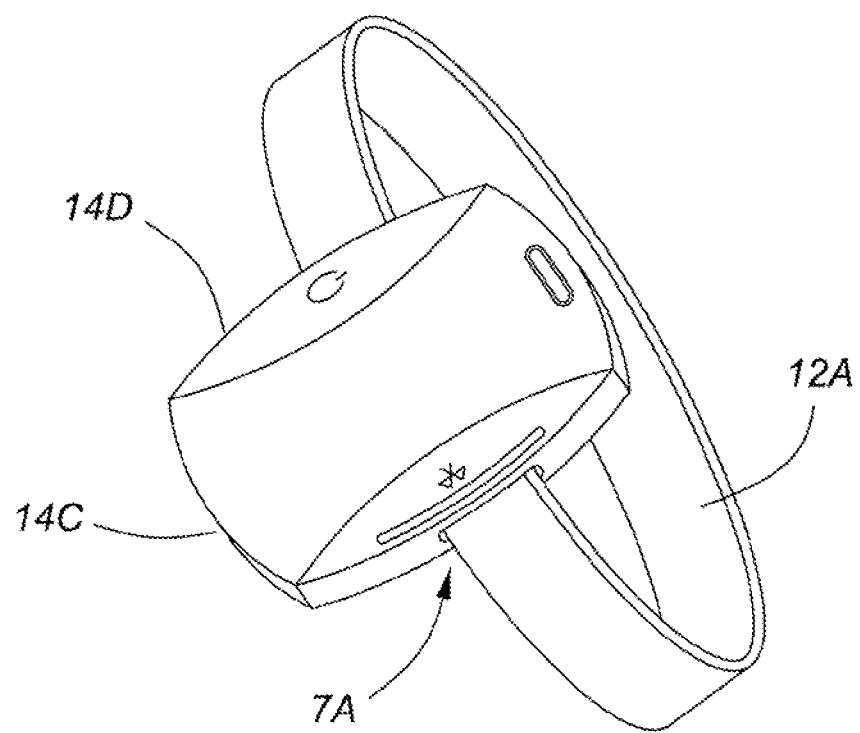
FIG. 1B is a side perspective view of a temperature reading device before mounting on a container.
Figure 1C:
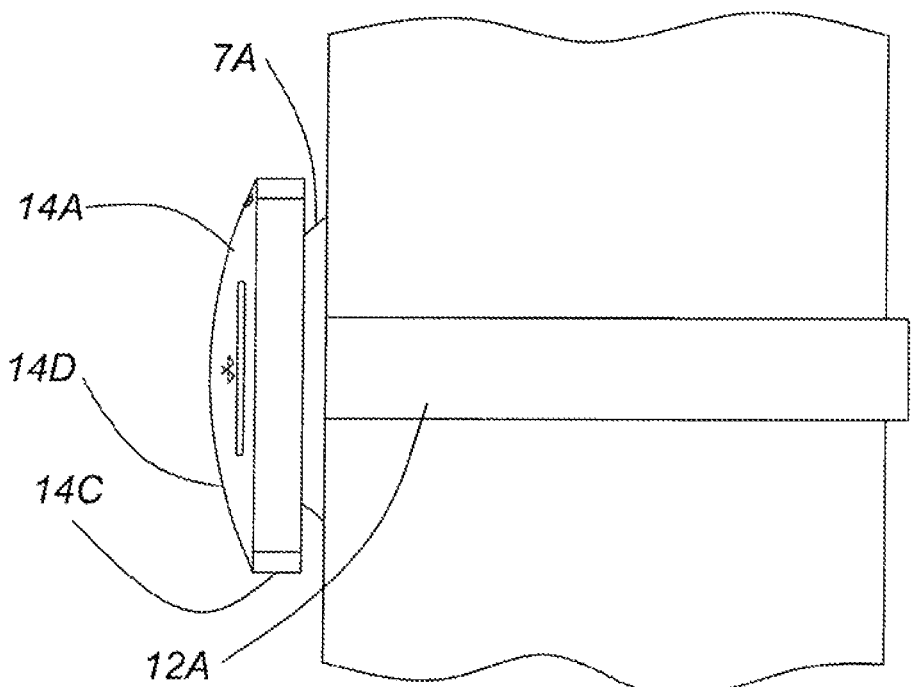
FIG. 1C is a side perspective view of a temperature reading device mounted on a container.
Figure 1D:
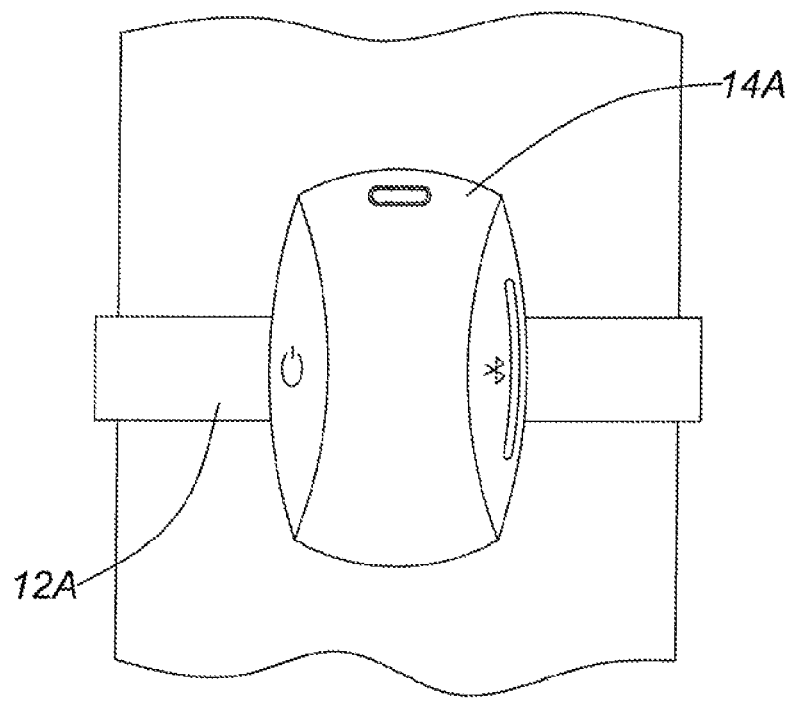
FIG. 1D is a top perspective view of a temperature reading device mounted on a container according to certain embodiments as described herein.
Figure 2:
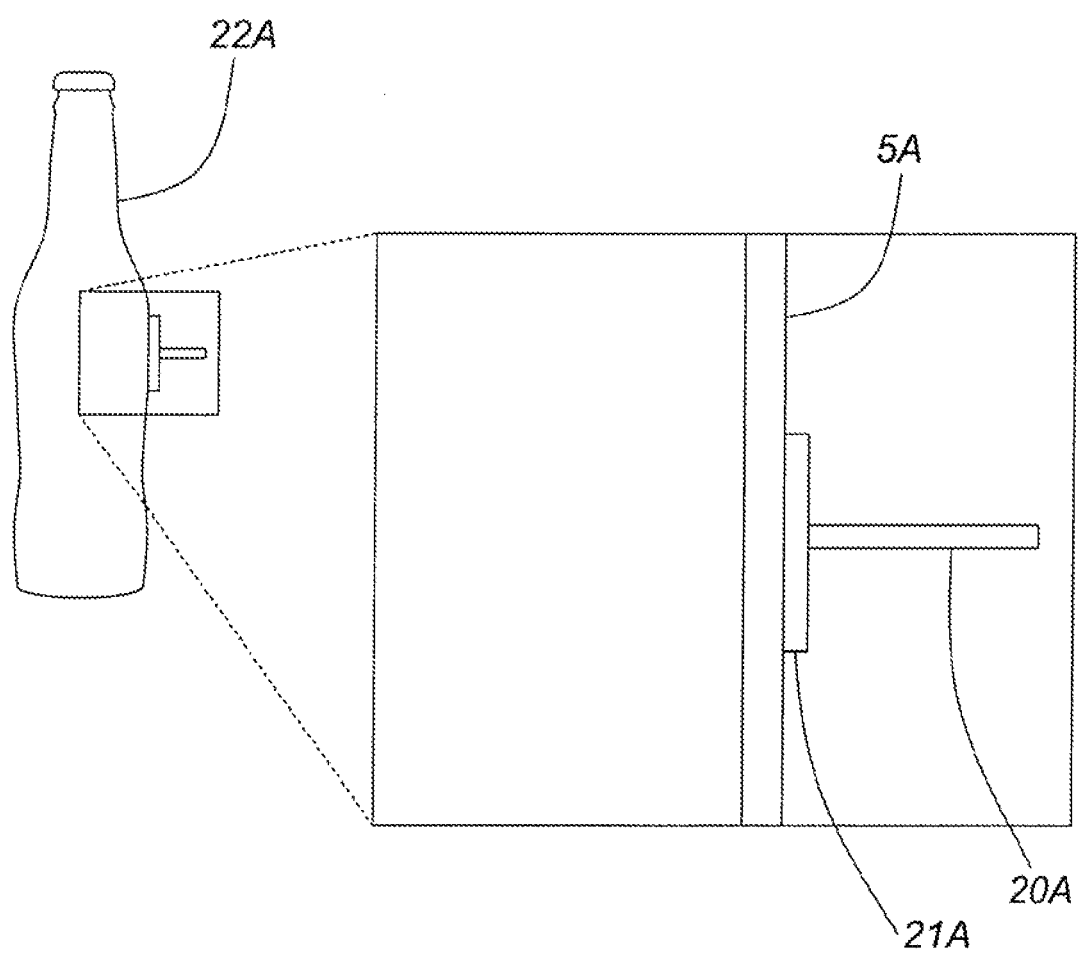
FIG. 2 shows a thermal gap pad and thermocouple in cross section when the device is mounted on the container.

FIGS. 1A, 1B, 1C and 1D depict an embodiment showing a device 10 for sensing the external temperature of a container for holding fluid, such as a beer bottle 22A (shown in FIG. 2). In the embodiment shown, the container holds a fluid that is an alcoholic beverage such as wine or beer, but can include any consumable or non-consumable fluid, including a liquid or a gas. In addition, the container need not be a glass bottle and includes other containers, such as receptacles for holding a liquid product including, but not limited to, cans, plastic bottles, metal bottles, vials, tins, jars, cartons and tubs. This includes containers of any material that hold medical liquid products. Further, the container includes other apparatus that hold or contain liquids, such as pipes and the like. Thus, the container can hold a stationary and/or a flowing fluid.

FIG. 1A, FIG. 1B, FIG. 1C, FIG. 1D show various views of an example of the sensing device 10A, which includes a band 12A for encircling and tightly conforming to the outer surface of a container 22A around its circumference thereof. The band 12A is elastomeric and made of silicon, plastic or other material that enables a snug fit with the contours of the external surface of the container 22A and which can facilitate insulation of a sensor 20A (shown in FIG. 2) within the housing 14A of the device 10A. The band 12A may also be made of other suitable material, such as elasticized webbing, which allows the device 10 to conform snugly around the outer surface of the container.

With reference to FIGS. 1B and 1C, the housing portion 14A may comprise a bottom housing portion 14C and a top housing portion 14D as determined when mounted on the container 22A.

Optionally, the band 12A has an adjusting device attached thereto for adjusting the pressure of the band 12A to ensure a snug fit around the container 22A. For materials that are highly elastomeric, such as silicone, such an adjusting device may be omitted.

The housing portion 14A accommodates a temperature sensor 20A, such as a thermocouple (FIG. 2) and a wireless means in communication with temperature sensor 20A for sending a signal to a wireless device, such as a Smart phone, tablet, Ipad™ or other wireless device.

While the faces of the device shown in FIG. 1 form shapes that are gently curved, the faces can also converge into points so that the housing portion 14A resembles a diamond when viewed in top plan.

As shown in FIG. 2, the temperature reading device 10A may be configured such that the temperature sensor 20A is in close contact with a thermal gap pad 21A, which in turn makes direct contact with the external surface 5A of the container 22A when the device 10A is mounted around the circumference of the body of the container 22A. The thermal gap pad 21A is sealed from ambient air against the external surface 5A of the container from elastic pressure from the band and a compressible insulating material 7A, such as closed cell foam. The compressible insulating material 7A is shown in FIG. 1C and is affixed to the underside of the housing. It should be appreciated, however, that the arrangement of the sensor 20A and thermal gap pad 21A is not shown to scale.

The thermal gap pad 21A is thermally conductive and is made of a material that typically has a thermal conductivity in the range of 5-15 W/mK. A broad range of materials can be used for the thermal gap pad, provided that such material selected has adequate thermal conductivity to transfer heat from the external surface of the container 22 to the sensor 20A, such as a thermocouple. Thermal gap pads are often made into sheets. The thermal gap pad 21A should conform snugly to the surface of the container and as mentioned this can be facilitated by the elastic pressure provided by the band 14A and compressible foam material 7A.

The sensor 20A, as mentioned, may be a thermocouple and contacts the thermal gap pad. Heat is transferred to the sensor 20a and the sensor 20A reads the temperature and temperature data may be sent to a wireless device as described below.

Figure 1E:
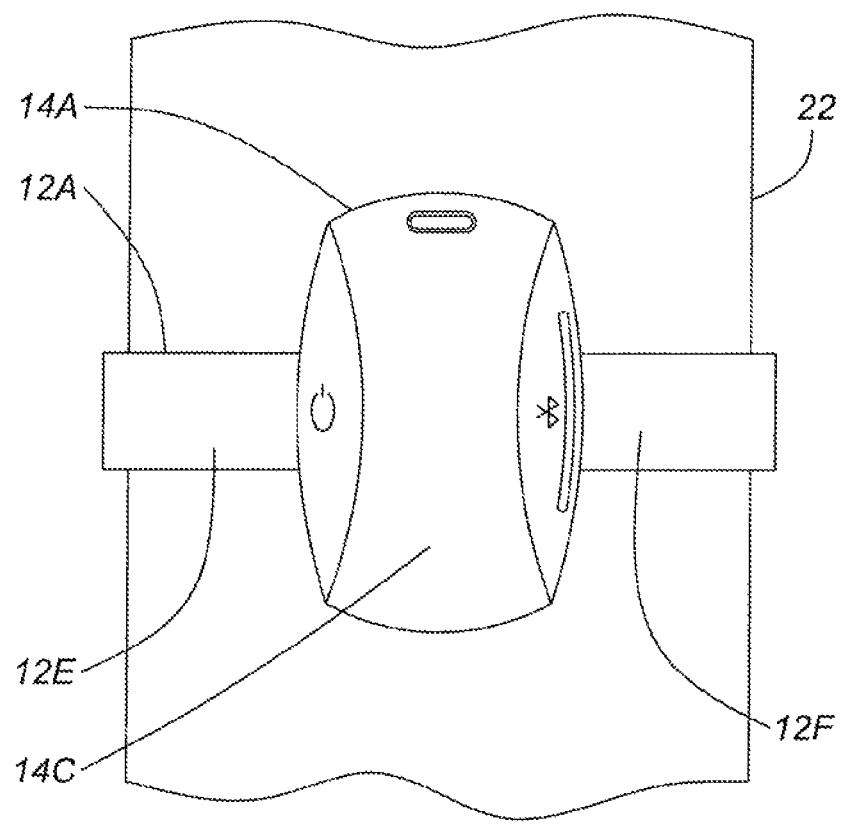
FIG. 1E shows a bottom portion of a housing of the device according to one embodiment.
Figure 1F:
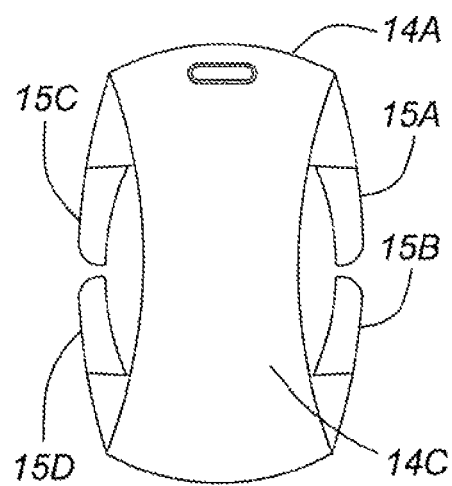
FIG. 1F shows a bottom portion of a housing of the device according to another embodiment.

FIGS. 1E and 1F shows how the band 12A may be mounted to the housing 14A. The bottom housing portion 14C may comprise split rings 15A-15D for receiving respective folded ends 12E and 12F of the band 12A. Such embodiment would be suitable for fabric webbing material that can be folded over and sewn together at its ends. The split rings 15A-15D allow the band 12A to be removed from the housing for ease for cleaning. Springs pins similar to those of a watch band could also be used in further embodiments.

Figure 3A:
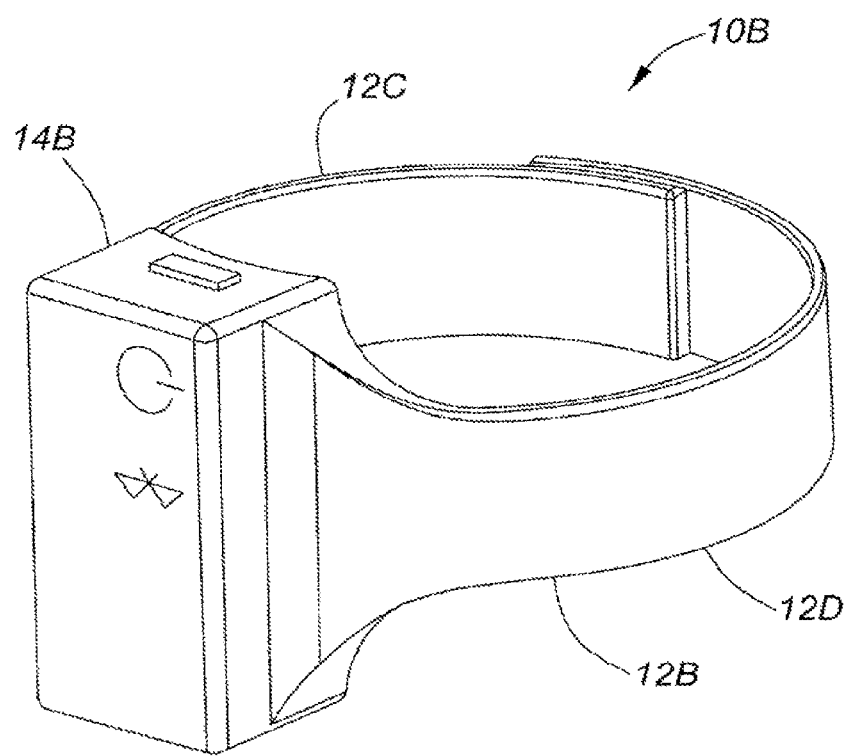
FIG. 3A is a top perspective side view of the temperature reading device in a closed position according to certain embodiments as described further herein.
Figure 3B:
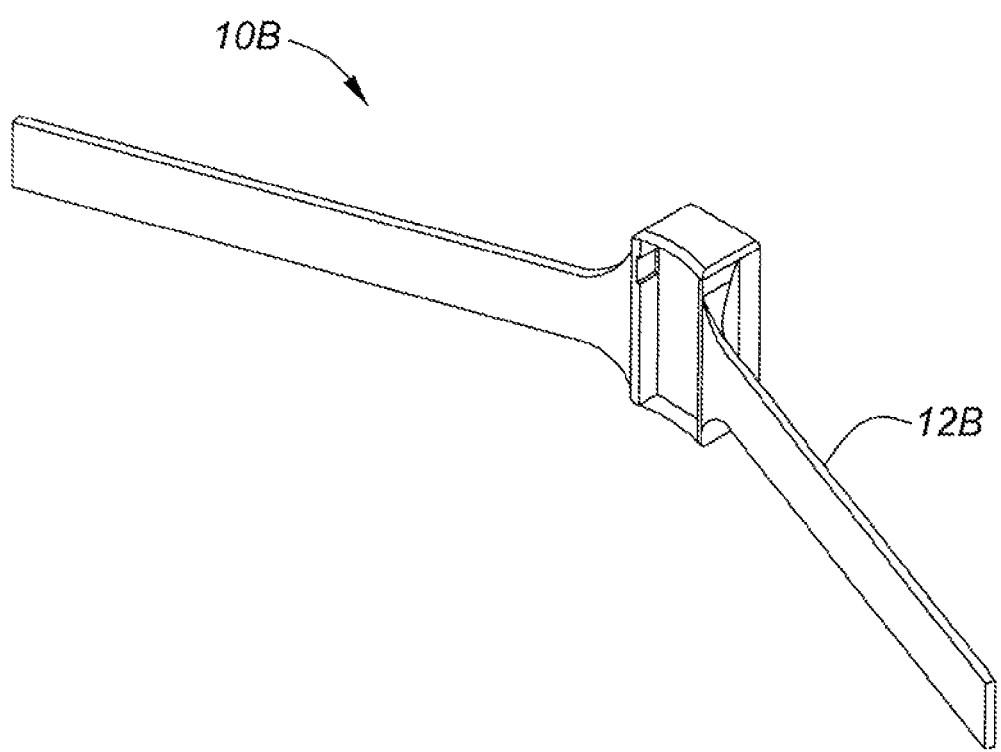
FIG. 3B is a perspective top rear view of the temperature reading device in an open position according to certain embodiments.
Figure 3C:
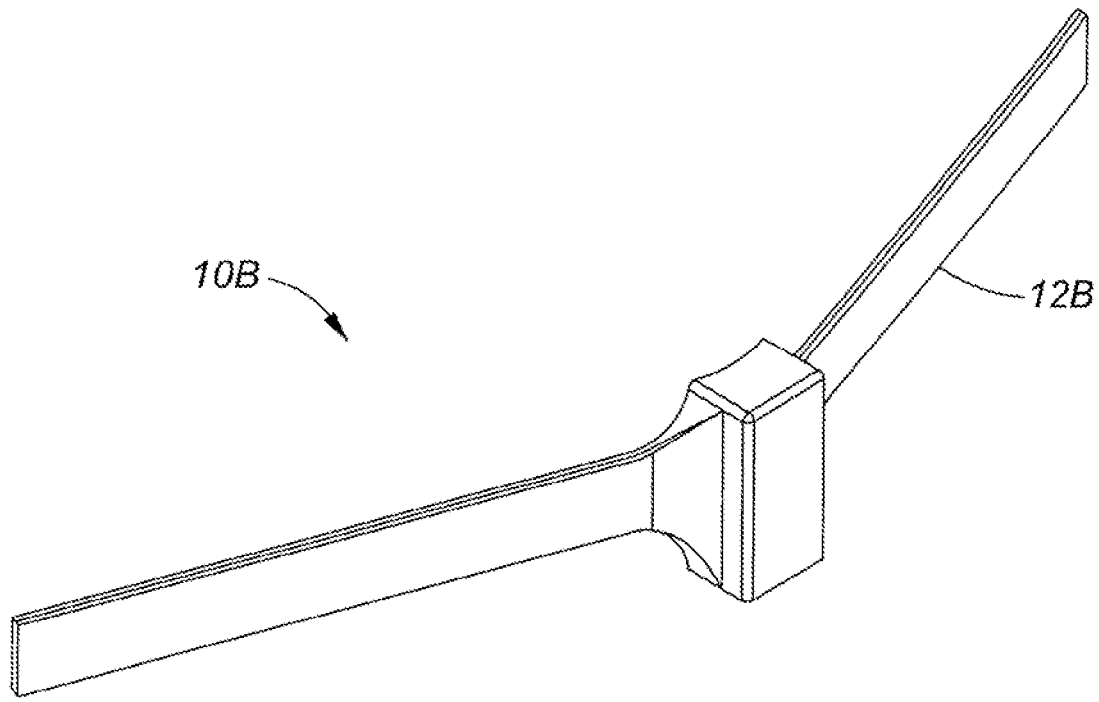
FIG. 3C is a perspective top front view of the temperature reading device in an open position according to certain embodiments.
Figure 3D:
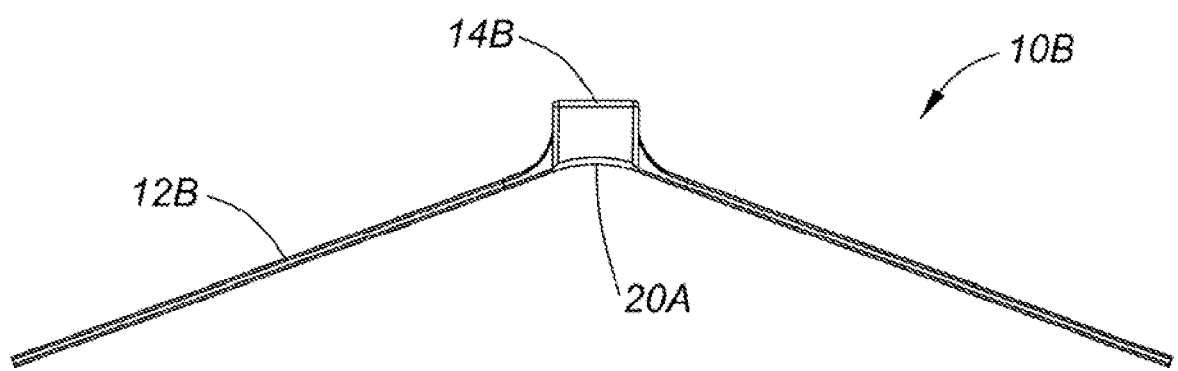
FIG. 3D is a top plan view of the temperature reading device in an open position according to certain embodiments.
Figure 4:
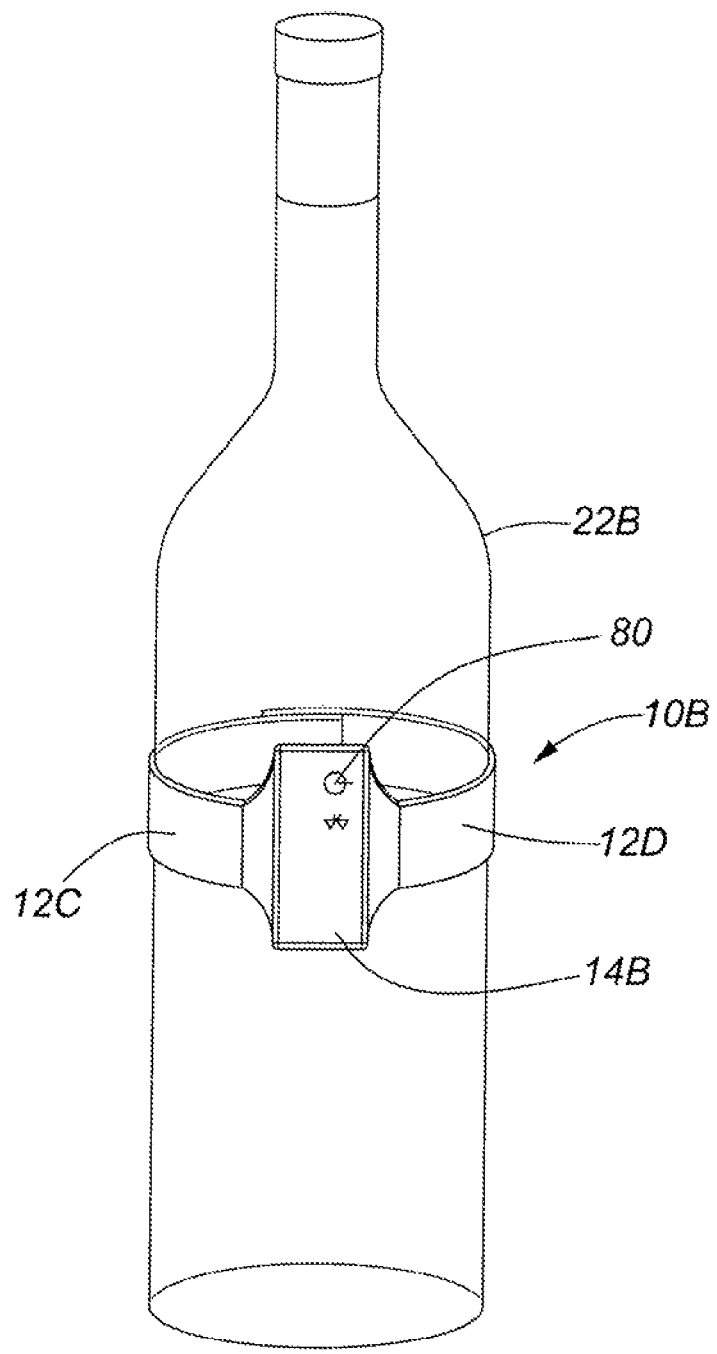
FIG. 4 shows the temperature reading device mounted on a wine bottle.

FIG. 3A depicts another embodiment showing device 10B for sensing the external temperature of a container holding a fluid, such as a bottle 22B containing a consumable liquid such as wine. FIG. 4 shows the device 10 of FIG. 2A mounted on the body portion of the bottle 22B.

Another example of a sensing device 10B is shown in FIGS. 3A to 3D and FIG. 4. The sensing device 10B in FIG. 3A, FIG. 3B, FIG. 3C, FIG. 3D and FIG. 4, includes a band 12B for at least partially encircling and conforming to the outer surface of the bottle 22B around its circumference thereof. In the embodiment shown, the band 12B has a first arm 12C and a second arm 12D and each wrap around a portion of the bottle 22B when in use and overlap at their distal ends as shown in FIG. 3A to secure the device to the bottle 22B. The band 12B may be elastomeric and made of silicon, plastic or other material that enables a snug fit with the outer contours of the external surface of the bottle 22 and that may, in certain embodiments, possess significant elastic properties as described above to enable abutment of the sensor 20A against the thermal gap pad 21A.

The device 10B also comprises a housing portion 14B that accommodates a temperature sensor 20 and a gap pad 21A in the arrangement shown in FIG. 2.

The temperature sensing device, including device 10A and 10B described above, may include a wireless means in communication with temperature sensor 20A for sending a signal to a wireless device, such as a Smart phone, tablet, Ipad™ or other wireless device. The housing portion 14A or 14B of the device 10A or 10B may optionally comprise a display, such as an LED display, which provides a digital reading of the temperature read by the sensor 20A.

The device 10A or 10B also comprises a means to power the device, such as a commercially available battery. The battery may be rechargeable, in which case a battery charger is used to charge the battery. The battery charger may supply power via a USB connector or socket that is supplied power through a USB charger. In another embodiment, the battery is charged by solar power.

As mentioned, FIG. 4 shows the device 10A mounted to a wine bottle 22B. As can be seen, the arms 12C and 12D together entirely extend around the circumference of the bottle 22B and overlap one another at their distal ends. The arms 12C and 12D provide sufficient tension to secure the housing region in snug fit against the outer surface of the bottle 22B. Such pressure allows the sensor 20A to tightly conform to the thermal pad 21A as shown in FIG. 2.

Figure 5:
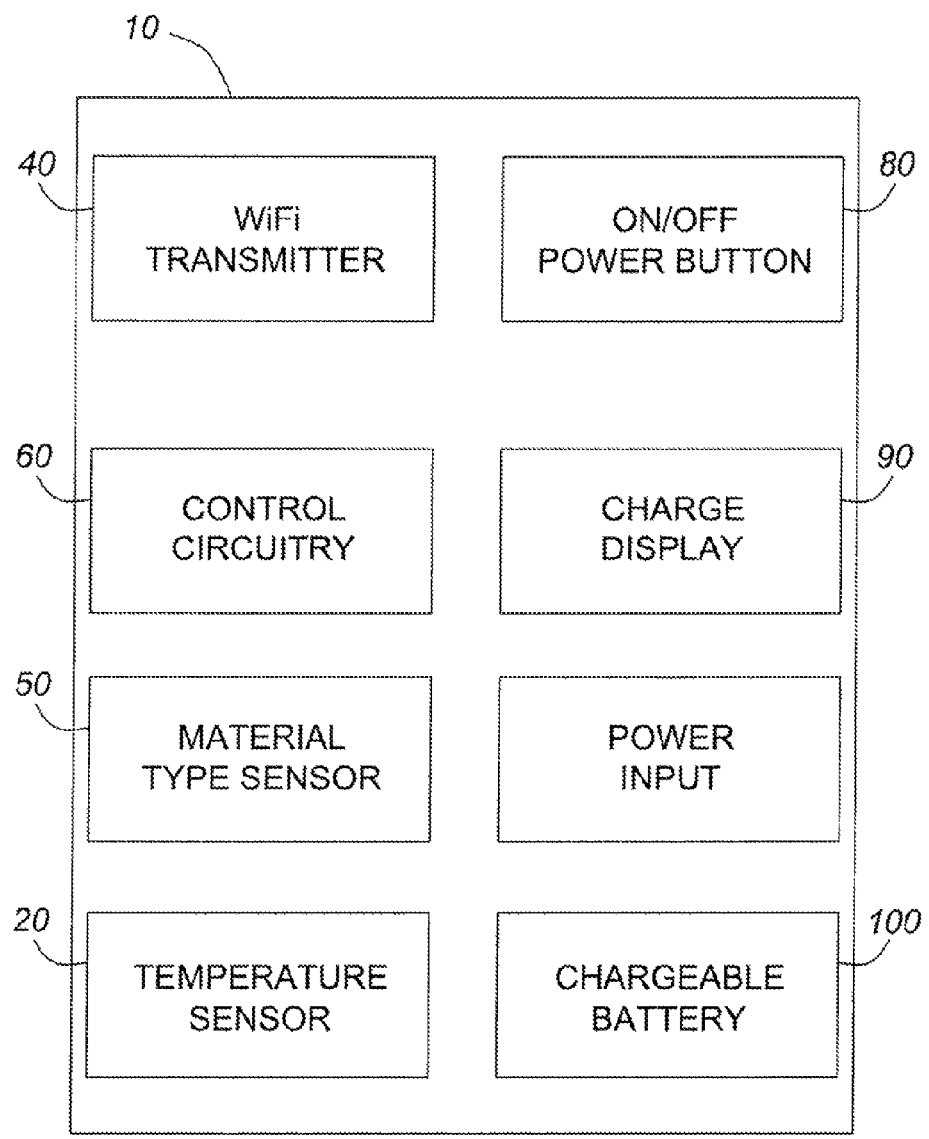
FIG. 5 is a block diagram of an example system showing the hardware and electronic design.

FIG. 5 is a block diagram of an example system of the device 10A or 10B depicting certain hardware and electronic components therein. In particular, the block diagram depicts the temperature sensor 20A, which is connected to a WIFI transmitter 40. The WIFI transmitter 40 receives temperature information as a digital or analog signal from the temperature sensor 20A (FIG. 2). The WIFI transmitter 40 in turn transmits the received temperature information signal directly or indirectly to a wireless device, such as a Smart phone (not shown). Control circuitry 60 is included to regulate operations of the temperature sensor 20A and/or the WIFI transmitter 40. The device 10A or 10B also has an ON/OFF power button 80 that, when depressed, turns the device on or off and a CHARGE display 90 which indicates whether the device 10A or 10B is charged or not. The ON/Off power button 80 and the CHARGE display 90 may be illuminated by an LED or other light source. The device 10A or 10B in the embodiment shown is powered by a chargeable battery 100. The chargeable battery 100 may receive power input from a power input, such as a USB socket that receives a USB charger.

Optionally, the device 10A or 10B also includes a material type sensor 50 that detects the type of material from which the container is constructed. As discussed in more detail below, different materials have different thermal conductivities, and the type of material will determine if a reading should be obtained after a time delay so that the surface temperature corresponds more accurately to that of the enclosed liquid. The time delay may be communicated to the sensor 20A so that the reading is not taken until a duration of time lapses corresponding to such delay. In another embodiment, the sensor takes readings from time zero and a reading is not registered on the device 10A or 10B or sent to a wireless device in communication therewith until sufficient time has elapsed corresponding to the time delay.

The WIFI transmitter 40 communicates with a wireless device. In another example, the user of the remote wireless device, such as a Smart phone, can download an application from the World Wide Web. The provision of such an application allows for the transmission of a text message or other notification to the user of the remote wireless device when the temperature of the surface of the bottle or other container falls below a value pre-set by the user as communicated via wireless means housed in temperature reading device 10A or 10B.

In those embodiments in which an application is downloaded from the web, the application may appear as an icon on a touch-screen of a wireless device, such as a Smart device representing the application. For example, the icon may contain an embedded image or text to identify the application. When the application icon is touched or otherwise selected by the user, a dialog box may appear prompting the user to enter the target temperature, optionally along with other information. In another embodiment, an interface may comprise icons or buttons depicting different kinds of beverages with pre-programmed temperature information. By selecting an icon or button, the Smart device may retrieve from its memory pre-programmed ideal temperature conditions associated with the kind of beverage or other liquid. For example, if a button labelled "Chardonnay" is selected, a temperature that is optimal for this kind of wine, which is typically around 11 degrees Celsius and which is pre-programmed into the Smart device would be retrieved from memory. In this case, a notification would appear on the Smart device when the temperature sensor in the temperature reading device reads a temperature that is at or below this value. In another embodiment, if a button labelled "beer" is pressed, or otherwise selected, the pre-programmed temperature of 0 degrees Celsius or a temperature at or near the freezing temperature of beer if the intent of the user is to prevent freezing of the beer after its placement in a freezer compartment would be retrieved from memory. In this embodiment, when the temperature sensor reads a temperature that is at or near 0 degrees Celsius as applicable, the user is notified via the Smart device. In a further embodiment, the computer application contains promotional text or images for marketing products or services, including different types of beer or wine that can be purchased by a commercial entity associated with the application. In yet a further embodiment, the application is linked to a database of products, including different wine or beer products that provide ideal drinking temperatures for a given product. This database could be further linked to promotional electronic materials. In another embodiment, the user of the wireless device, such as a Smart device, will be prompted to enter the type of container being measured, for example a can, bottle or the like, or the material type of the container. It will be appreciated, however, that the foregoing is exemplary only and that other configurations of text and/or icons on the interface, or wireless communication systems, are possible for inclusion in the design of the application or electronic components in device 10.

It will also be appreciated that the notification provided by the remote wireless device, such as a Smart device, may also take various forms. In the case of a Smart phone, a text message may be sent to the phone when the target temperature is attained. The text message may be sent to a user's phone number that is entered into the application. In another embodiment, an audible signal is emitted from the remote wireless device to alert the user that the beverage is ready for consumption or serving. In yet a further embodiment, the display of the remote wireless device may flash or change colour in a manner that alerts the user when an ideal temperature is reached.

In one embodiment, the temperature sensor 20A is an analog or digital temperature sensor. A non-limiting example of a temperature sensor that could be used in the practice of select embodiments is a sensor commercially available at Maxim Integrated™. Such temperature sensors detect the temperature of the surface of a container and convert the reading into an electrical signal. Common types of temperature sensors included within the scope of the disclosure include thermocouples, resistance temperature detectors (RTDs), thermistors, local temp sensor ICs, and remote thermal diode temperature sensor ICs. Clinical grade temperature sensors may be utilized in the practice of certain embodiments and meet the clinical thermometry specification of the ASTM E1112 for accuracy. In another embodiment, remote thermal diode temperature sensors are utilized that employ an external bipolar transistor as the sensing element and include signal conditioning circuitry to measure temperature using one or more external transistors.

As discussed, a material type sensor 50 may also be included in the device 10A or 10B for detecting the type of material of which the container is made. The material type sensor 50 may be a metal sensor that measures electrical conductivity. The material sensor could be in the form of two electrical contacts that pass electricity through the material and measure conductance using known methodologies. Other types of sensors known in the art could be employed as well to detect glass, plastic or other materials. As discussed in more detail below, different materials have different thermal conductivities and a temperature reading off-set can be employed to factor in the time required for the surface of the material to reach the same temperature as, or temperature similar to that of, the liquid contained within the container.

In certain embodiments, the temperature sensor may be coupled to or otherwise in communication with a WIFI transmitter 40 that is a Wi-Fi microcontroller or System on a Chip (SOC) that can send a signal to the remote wireless device, such as a Smart phone. Such a signal may be enabled via Bluetooth™. In another embodiment, the wireless communication means is a Bluetooth™ transceiver module. A voltage signal from the temperature sensor 20 may be converted to an equivalent frequency value that is then transmitted to a wireless Smart phone. The data received by the Smart phone can be inputted to an application downloaded on the Smart phone, as noted previously.

In another embodiment, housing region 14B of the device 10B is configured so that the area in the vicinity of the temperature sensor 20A creates a seal around the surface of the temperature sensor so that incorrect readings are avoided or reduced by creating a barrier from the ambient temperature of the fridge or freezer compartment. As can be seen in the figures that depict device 10B (FIG. 3A-D and FIG. 4), housing region 14B is significantly enlarged relative to the band to function as a contained, physical barrier to shield the temperature sensor 20A against the ambient temperature environment. In the embodiment shown, band arms 12C and 12D widen at respective ends proximate to the housing region 14B to provide an additional insulation barrier.

The housing region 14B may also be made of a material that has low thermal conductivity. For example, the housing region 14B that encloses the sensor 20A and other electric components may have a thermal conductivity ($\lambda$) of less than 10, 8, 6, 4, 2 or 1 watts per meter kelvin (W·m−1·K−1) measured at 293 degrees K. In yet a further embodiment, the housing region 14B at its underside that abuts the surface of container 22B is a compressible insulating material similar to material 7A of device 10A.

As discussed, the thermal conductivity of the material used in the manufacture of the solid container can impact the temperature reading and a time lapse may be required, dependent on the material, before a reading is taken or inputted to ensure sufficient time for the temperature of the material to correspond or approximate that of the internal liquid held by the container. Thermal conductivity is the ability of a material to transfer heat energy across a given distance. Higher thermal conductivity values, such as those of metals, are associated with materials that are able to conduct greater amounts of heat, while materials with lower values are thermal insulators. For example, glass, plastic and aluminum are common materials used in the manufacture of containers that hold a consumable liquid. These materials have known thermal conductivities that vary widely as provided in the table below:

TABLE 1

Thermal conductivities of common materials

| Material | Thermal conductivity ($W \cdot m^{-1} \cdot K^{-1}$) | Temperature (K) |
|---|---|---|
| Copper | 365 | 275 |
| Aluminum alloy (88% aluminum, 12% magnesium) | 77.4 | 273 |
| Steel, stainless | 16.2-24 | 296 |
| Glass, Pyrex 7740 | 1.11 | 273 |
| Plastic, fiber-reinforced | 0.23-1.06 | 293-296 |
| Rubber CRC, 92% nd | 0.16 | 303 |

In the case of a metal, a time lapse for an accurate reading may not be required or will be or a short time duration due to its high thermal conductivity. On the other hand, for plastics materials, a time lapse may be required for an accurate reading due to its low thermal conductivity.

The type of material that the container is made of can be detected by the material type sensor 50 housed in the housing region 14A, 14B of device 10A or 10B. For example, a metal container such as a beer can could be detected using electric conductivity. In this case, the sensor could be two electrical contacts enabling the device to sense whether the container being measured is made of a metal or not. In another embodiment, other materials such as glass and plastic could be detected using sensors known in the art. Moreover, thermal conductivity sensors are readily available and can be used to measure materials, such as glass, in the case of a beer or wine bottle or aluminum in the case of an aluminum can that holds beer or other liquid.

In another embodiment, the type of material is entered manually by a user, such as on a computer-implemented application, and the temperature measurement delay or time-point at which the temperature information is registered is automatically programmed into the device or a computer application that communicates with the device.

As noted, the temperature sensing device 10A or 10B may communicate with a wireless device. The wireless device that the temperature sensing device 10A or 10B communicates with need not be limited to a Smart phone. In this regard, the remote wireless device can be a tablet, ipad™, or other Smart device, including Android™ devices. Moreover, a dedicated wireless device designed specifically for use with temperature sensing device 10A or 10B may alert the user that the beverage in the container 22A or 22B is ready for consumption. Such a dedicated wireless device may include a display and may be programmable so that a temperature target can be entered into the wireless device or pre-programmed into it. The display may alert the user that the beverage is ready for drinking by displaying a text message, emitting an audible signal or providing a colour change on a display thereof. Such device may further comprise a magnet so that it can be mounted on the outside of a fridge.

The band 12A or 12B imparts several advantages to the function of the device 10A or 10B. The band 12A or 12B advantageously allows the device 10A or 10B to fit snugly around the circumference of any standard wine or beer bottle without adaptation and additionally may serve an insulating function in that it allows a snug fit of insulating material 7A on the surface of the container 22A or 22A and close abutment of sensor to the gap pad 21A to facilitate more accurate temperature readings (see e.g., FIG. 2). This latter advantage may be particularly beneficial when the container 22A or 22B is placed in the harsh environment of a freezer or outside a building in cold climates.

As noted, in one embodiment, the elastomeric band 12A or 12B of device 10A or 10B is made of flexible material. That is, the band in certain embodiments can be stretched by force beyond at least 20% of its original length and return to its original length after the force is released. This allows the device to be easily mounted on a bottle of virtually any size. Due to its simplicity of design, the device 10A or 10B can be manufactured economically.

Figure 6A:
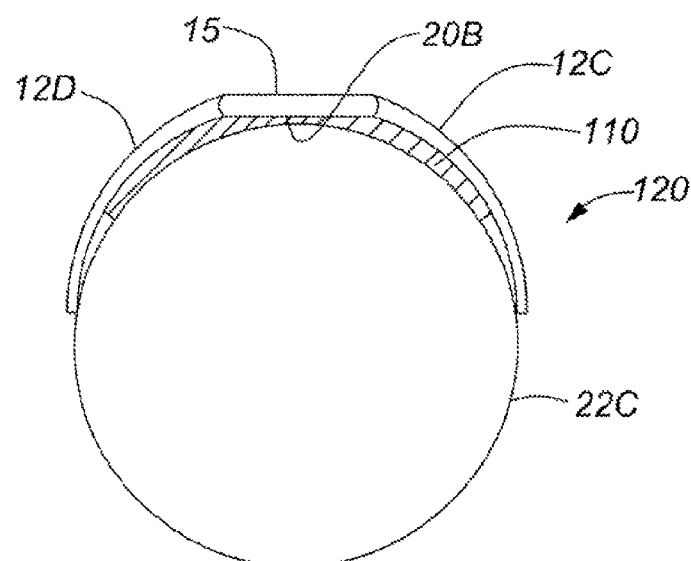
FIG. 6A is a PRIOR ART temperature sensing C-shaped clamp shown in cross-sectional view when mounted on a wine bottle for measuring the surface temperature thereof.
Figure 6B:
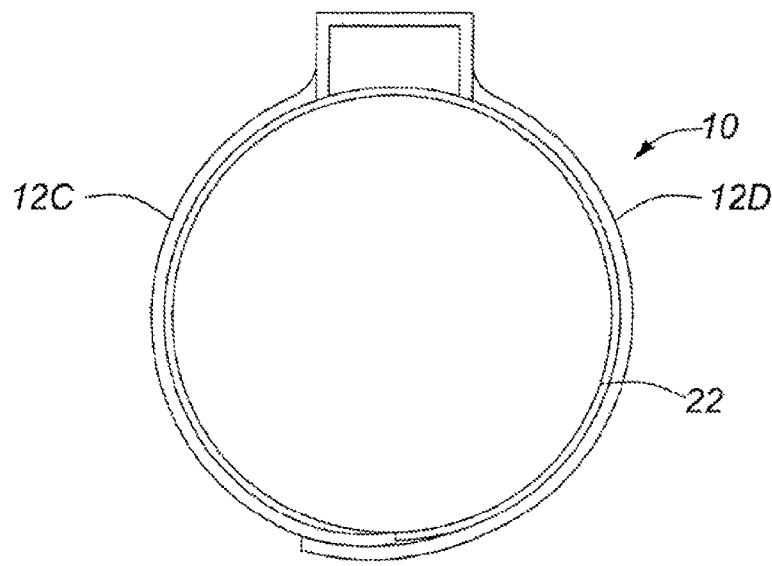
FIG. 6B is the temperature sensor of select embodiments shown in cross-sectional view when mounted on a bottle for measuring the surface temperature thereof.

To illustrate the advantageous features of the sensing device 10A or 10B over known prior art devices, as described in US 2016/0131533A1, reference is made to FIG. 6A, which depicts a cross-sectional view of a known PRIOR ART wine temperature sensor 120 mounted on a bottle 22C. In such a known wine temperature sensor 120, a metal plate 15 touches the surface of a wine bottle (see discussion in US 2016/0131533A1) at a point 20B that contacts the surface of the bottle 22C. However, this creates air gaps that impede an accurate temperature reading and do not provide adequate insulation around the temperature sensor. To address this, US 2016/0131533A1 discloses that a separate insulator material, such as a malleable neoprene material 110 (FIG. 4A) should be mounted around the sensor to provide insulation against ambient.

According to non-limiting embodiments of the invention, and as shown in FIG. 4, the housing region 14A and 14B of device 10A and 10B itself surrounds the sensor 20A and provides improved insulation by providing the necessary tension by band 12A or 12B to hold the bottom of the housing tightly against the surface of the container in the vicinity of the sensor. The band 12B may comprise free ends 12C and 12D that overlap as shown in FIG. 6A to provide a snug fit of compressible material 7A and/or abutment of thermal gap pad 21A against the sensor 20A, or can be made of a single elastomeric band as shown in FIG. 1B in the case of device 10A to provide such tight fit of the components. Alternatively, the band ends are attachable via a fastening means, including Velcro™, a snap-closure or the like.

Moreover, the band may display text, including trademark or trade name information such as "CHILLY BANDZ™", or other text as desired.

In another embodiment, the temperature sensing device 10 itself emits a sound or other alert such as text on the display when the target temperature is reached rather than communicating this information via a wireless device.

As noted, other containers besides those holding a consumable beverage can be used in the practice of certain embodiments herein. For example, the liquid held by the container can be a medicine that requires precise temperature control. In one embodiment, the medicine is insulin and a user of the device is alerted when the temperature falls above or below a target temperature range.

The device 20 may also be used to remotely monitor the external temperature of a pipe. This includes household or industrial pipe systems that contain flowing liquid, such as municipal water. The user can be notified if a pipe temperature falls below a predetermined temperature. Such notification can be advantageous to prevent pipes from being fractured or bursting due to freezing of the liquid contained therein when ambient temperature falls below zero in cold climates.

Additional applications for the temperature sensor device described herein would be apparent to those of ordinary skill in the art.

It will be appreciated that the container can include a number of different solid structures for holding a fluid that is stationary or moving. This includes a pipe, bottle, can, vial, or the like. The fluid can be a liquid or a gas.

It should be appreciated that the foregoing is simply a description of an example and that other embodiments and variations not described herein fall within the scope of the invention as defined by the claims appended hereto.

The invention claimed is:

1. A sensing device for measuring the temperature of a container enclosing a fluid that is stationary or in motion, the sensing device comprising:
    a band for completely encircling and conforming to the outer surface of the container;
    a housing portion attached to or integral with the band that accommodates a temperature sensor for contact with and for measuring the temperature of the outer surface of the container;
    a thermally conductive material disposed on the housing portion that abuts the outer surface of the container on one side when the device is mounted on the container and on a second side abuts the temperature sensor;
    one or more material-type sensors disposed within or on the sensing device; and
    a wireless communication means in communication with the temperature sensor wherein:
    the wireless communication means transmits temperature data to a remote wireless device, thereby notifying a user when a temperature measurement falls above or below a target temperature or range thereof;
    the band is made of elastomeric material so that when mounted on the container, or tightened therearound, the temperature sensor abuts snugly against the thermally conductive material; and
    a material type of the container is detected by the one or more material-type sensors.

2. The device of claim 1, further comprising a display for displaying the temperature of the outer surface of the container.

3. The device of claim 1, further comprising a chargeable power supply that is a battery and the device comprises a USB socket for charging the battery.

4. The device of claim 1, further comprising a compressible insulating material on the side of the housing portion that abuts the container when the device is mounted on the container; wherein the band compresses the compressible insulating material against the outer surface of the container when in use to insulate the sensor.

5. The device of claim 4, wherein the compressible insulating material is a closed-cell foam.

6. The device of claim 1, wherein the remote wireless device is a Smart device or a dedicated wireless device.

7. The device of claim 6, wherein the remote wireless device is a Smart phone and comprises an application that receives the temperature data from the wireless communication means in communication with the temperature sensor.

8. A sensing device for measuring the temperature of a container enclosing a fluid, the sensing device comprising:
    a band for encircling and conforming to the outer surface of the container;
    a housing portion attached to or integral with the band that accommodates a temperature sensor for contact with and for measuring the temperature of the outer surface of the container, wherein the housing portion is made of an insulating material and is dimensioned to surround and shield the outer surface of the container in contact therewith from ambient temperature when the band is secured to the container; and
    a wireless communication means in communication with the temperature sensor, wherein the wireless communication means transmits temperature data to a remote wireless device, thereby notifying a user when a temperature measurement falls above or below a target temperature or range thereof as determined at a time point after a time delay to account for thermal conductivity of a material type of the container, wherein the band entirely encircles the circumference of the container when in use to thereby secure the housing portion in a snug fit to the container.

9. A sensing device for measuring the temperature of a container enclosing a fluid that is stationary or in motion, the sensing device comprising:
    a band for completely encircling and conforming to the outer surface of the container;
    a housing portion attached to or integral with the band that accommodates a temperature sensor for contact with and for measuring the temperature of the outer surface of the container;
    a thermally conductive material disposed on the housing portion that abuts the outer surface of the container on one side when the device is mounted on the container and on a second side abuts the temperature sensor; and
    a wireless communication means in communication with the temperature sensor; wherein:
    the wireless communication means transmits temperature data to a remote wireless device, thereby notifying a user when a temperature measurement falls above or below a target temperature or range thereof;
    the band is made of elastomeric material so that when mounted on the container, or tightened therearound, the temperature sensor abuts snugly against the thermally conductive material; and
    the temperature sensor measures the temperature of the container after a time delay to account for a material type of the container.

10. The sensing device according to claim 9, further comprising one or more material-type sensors disposed within or on the sensing device, wherein a material type of the container is detected by the one or more material-type sensors, and the time delay is automatically established in dependence upon the material type of the container.

* * * * *